(12) United States Patent
Kobayashi et al.

(10) Patent No.: US 8,051,245 B2
(45) Date of Patent: Nov. 1, 2011

(54) INFORMATION PROCESSING SYSTEM CAPABLE OF RECOGNIZING AND ACCESSING REMOVABLE EXTERNAL STORAGE DEVICE IN SIMPLE SCHEME, METHOD FOR CONTROLLING INFORMATION PROCESSING SYSTEM, AND IMAGE INPUT AND OUTPUT APPARATUS

(75) Inventors: Minako Kobayashi, Ikeda (JP);
Takehisa Yamaguchi, Ikoma (JP);
Katsuhiko Akita, Amagasaki (JP);
Kazuya Anezaki, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 182 days.

(21) Appl. No.: 12/638,387

(22) Filed: Dec. 15, 2009

(65) Prior Publication Data
US 2010/0153643 A1   Jun. 17, 2010

(30) Foreign Application Priority Data

Dec. 16, 2008   (JP) ................................ 2008-319817

(51) Int. Cl.
*G06F 13/00*   (2006.01)
(52) U.S. Cl. ........... 711/115; 711/2; 358/1.15; 358/1.16
(58) Field of Classification Search .................. None
See application file for complete search history.

(56) References Cited

U.S. PATENT DOCUMENTS

| 7,771,133 B2* | 8/2010 | Oomura et al. ................. 400/62 |
| 2006/0209337 A1 | 9/2006 | Atobe et al. |
| 2008/0147909 A1* | 6/2008 | Zhang et al. .................... 710/24 |
| 2009/0024746 A1* | 1/2009 | Welch ............................ 709/228 |
| 2009/0316176 A1 | 12/2009 | Fujimori et al. |
| 2010/0030925 A1 | 2/2010 | Inoue |

FOREIGN PATENT DOCUMENTS

| JP | 2005-348125 | 12/2005 |
| JP | 2006-15532 A | 1/2006 |
| JP | 2006-302257 | 11/2006 |
| JP | 2007-108898 | 4/2007 |
| JP | 2007-299225 | 11/2007 |
| JP | 2007-300434 | 11/2007 |
| JP | 2008-066935 | 3/2008 |
| JP | 2010-033519 | 2/2010 |
| JP | 4582208 | 11/2010 |

OTHER PUBLICATIONS

Office Action (Notice of Grounds of Rejection) dated Dec. 7, 2010, issued in the corresponding Japanese Patent Application No. 2008-319817, and an English Translation thereof.

* cited by examiner

*Primary Examiner* — Kevin Ellis
*Assistant Examiner* — Alan Otto
(74) *Attorney, Agent, or Firm* — Buchanan Ingersoll & Rooney PC

(57) ABSTRACT

It is recognized that an attached USB memory is an unanalyzable USB memory. Then, disconnect setting is made. A USB connection process is performed. A PC is instructed through a connection line to establish USB connection. The PC recognizes that the attached device is a USB-connected MFP. The PC acquires data control information of the MFP. The MFP then transfers, through the connection line, the data control information output from the USB memory.

8 Claims, 12 Drawing Sheets

US 8,051,245 B2

INFORMATION PROCESSING SYSTEM CAPABLE OF RECOGNIZING AND ACCESSING REMOVABLE EXTERNAL STORAGE DEVICE IN SIMPLE SCHEME, METHOD FOR CONTROLLING INFORMATION PROCESSING SYSTEM, AND IMAGE INPUT AND OUTPUT APPARATUS

This application is based on Japanese Patent Application No. 2008-319817 filed with the Japan Patent Office on Dec. 16, 2008, the entire content of which is hereby incorporated by reference.

BACKGROUND OF THE INVENTION

1. Field of the Invention

The present invention relates to an information processing system including an image input and output apparatus having a USB (Universal Serial Bus) connector to which a USB device can be attached, and an information processing apparatus connected through a network.

2. Description of the Related Art

In recent years, a memory card and the like serving as a removable external storage device for storing image data and the like have widely been used in a widely used portable information terminal (PDA) (Personal Data Assistance), a digital camera and the like.

In addition, a multi-function peripheral (MFP) serving as an image input and output apparatus capable of forming an image based on image data stored in the external storage device has come into wide use.

Meanwhile, a USB memory has widely been used as a removable external storage device in recent years, and data security measures have recently become important. As one exemplary measure, a USB memory having not only a data area but also an application area and capable of storing date in the data area using an encryption application and the like stored in the application area has been introduced.

For example, a USB memory complying with U3® specifications proposed by SanDisk® Corporation (hereinafter also referred to as a U3® memory) is available.

In many cases, the application of the U3® memory as described above is adapted to a general-purpose operating system (OS) (for example, Windows®) generally used in a personal computer (PC), but not adapted to an embedded OS (for example, VxWorks®) incorporated in the MFP.

Therefore, even when the U3® memory is attached to the connector terminal of the USB provided in the MFP, the MFP cannot recognize the application stored in the U3® memory, and therefore, cannot control the U3® memory.

In this regard, Japanese Laid-Open Patent Publication No. 2006-015532 discloses a scheme by which the peripheral control software is downloaded through a network from the service site to allow recognition of the USB devices (for example, U3® memory and the like) corresponding to peripherals that cannot be recognized.

However, in order to allow the USB devices to be controlled, this scheme requires the peripheral control software to be provided in the service site depending on the OS. This poses a problem of a significant increase in cost in the case where updates are frequently performed.

SUMMARY OF THE INVENTION

The present invention is directed to solve the above-described problems and aims to provide an information processing system capable of recognizing and accessing a U3® memory and the like in a simple scheme, and a method for controlling the information processing system.

An information processing system according to an aspect of the present invention includes an image input and output apparatus including a plurality of first connectors each capable of connecting a removable external storage device; an information processing apparatus including a second connector capable of connecting a removable external storage device; and a connection line for connecting one of the plurality of first connectors of the image input and output apparatus and the second connector of the information processing apparatus to each other. The image input and output apparatus further includes a first communication device for transmitting and receiving data to and from the information processing apparatus through a network; and a first controller for controlling the image input and output apparatus. The information processing apparatus further includes a second communication device for transmitting and receiving data to and from the first communication device of the image input and output apparatus through the network; and a second controller for controlling the information processing apparatus. The first controller is configured to determine based on information output from the removable external storage device connected to another one of the plurality of first connectors whether the removable external storage device is recognizable to the image input and output apparatus. When determining that the removable external storage device is unrecognizable to the image input and output apparatus, the first controller is configured to transfer, to the information processing apparatus, the information output from the removable external storage device through the connection line. The second controller is configured to access the data stored in the removable external storage device based on the information output from the removable external storage device and transferred from the image input and output apparatus through the connection line, and transmit the data stored in the removable external storage device through the second communication device to the image input and output apparatus.

Preferably, the image input and output apparatus further includes a scanner for scanning image data of a document. The first controller is configured to determine whether an instruction to store the image data scanned by the scanner in the removable external storage device unrecognizable to the image input and output apparatus is issued, and, when determining that the instruction is issued, transmit the scanned image data through the first communication device to the information processing apparatus. The second controller is configured to perform a process of storing the scanned image data received through the second communication device in the removable external storage device connected to the another one of the plurality of first connectors through the connection line.

Preferably, the image input and output apparatus further includes a printer for performing a process of printing image data. The first controller is configured to determine whether an instruction to print, by the printer, the image data stored in the removable external storage device unrecognizable to the image input and output apparatus is issued, and, when determining that the instruction is issued, transmit an acquisition instruction through the first communication device to the information processing apparatus. The second controller is configured to access the image data stored in the removable external storage device based on the acquisition instruction received through the second communication device, acquire the image data from the removable external storage device through the connection line, and transmit the acquired image data to the image input and output apparatus through the second communication device. The first controller is configured to perform the process of printing the image data received through the first communication device.

Preferably, the removable external storage device corresponds to a universal serial bus device.

In a method for controlling an information processing system according to another aspect of the present invention, the information processing system includes an image input and output apparatus having a plurality of first connectors each capable of connecting a removable external storage device, an information processing apparatus having a second connector capable of connecting a removable external storage device, and a connection line for connecting one of the plurality of first connectors and the second connector of the information processing apparatus to each other. The image input and output apparatus includes a first communication device for transmitting and receiving data to and from the information processing apparatus through a network. The information processing apparatus includes a second communication device for transmitting and receiving data to and from the first communication device of the image input and output apparatus through the network. The method includes the steps of: in the image input and output apparatus, determining based on information output from the removable external storage device connected to another one of the plurality of first connectors whether the removable external storage device is recognizable to the image input and output apparatus; and, when determining that the removable external storage device is unrecognizable to the image input and output apparatus, transferring, to the information processing apparatus, the information output from the removable external storage device through the connection line. The method further includes the steps of: in the information processing apparatus, accessing the data stored in the removable external storage device based on information output from the removable external storage device and transferred from the image input and output apparatus through the connection line; and transmitting the data stored in the removable external storage device through the second communication device to the image input and output apparatus.

Preferably, according to the method for controlling the information processing system, the image input and output apparatus further includes a scanner for scanning image data of a document. The method includes the steps of: in the image input and output apparatus, determining whether an instruction to store the image data scanned by the scanner in the removable external storage device unrecognizable to the image input and output apparatus is issued; and, when determining that the instruction is issued, transmitting the scanned image data through the first communication device to the information processing apparatus. The method further includes the step of: in the information processing apparatus, storing the scanned image data received through the second communication device in the removable external storage device connected to the another one of the plurality of first connectors through the connection line.

Preferably, according to the method for controlling the information processing system, the image input and output apparatus further includes a printer for performing a process of printing image data. The method includes the steps of: in the image input and output apparatus, determining whether an instruction to print, by the printer, the image data stored in the removable external storage device unrecognizable to the image input and output apparatus is issued; and, when determining that the instruction is issued, transmitting an acquisition instruction through the first communication device to the information processing apparatus. The method further includes the steps of: in the information processing apparatus, accessing the image data stored in the removable external storage device based on the acquisition instruction received through the second communication device; acquiring the image data from the removable external storage device through the connection line; and transmitting the acquired image data to the image input and output apparatus through the second communication device. The method further includes the step of: in the image input and output apparatus, performing the process of printing the image data received through the first communication device.

An image input and output apparatus according to still another aspect of the present invention including a plurality of connectors each capable of connecting a removable external storage device and connected to an information processing apparatus through a connection line connected to one of the plurality of connectors includes a controller for controlling the image input and output apparatus; and a communication device for transmitting and receiving data to and from the information processing apparatus through a network. The controller is configured to determine based on information output from the removable external storage device connected to another one of the plurality of connectors whether the removable external storage device is unrecognizable to the image input and output apparatus; when determining that the data stored in the removable external storage device is unrecognizable to the image input and output apparatus, transfer, to the information processing apparatus, the information output from the removable external storage device through the connection line; and receive, through the communication device, the data stored in the removable external storage device accessed by the information processing apparatus through the connection line based on the information output from the removable external storage device and transferred from the image input and output apparatus.

According to the above-described configuration, even when a prescribed removable external storage device cannot be recognized and accessed due to the type of the OS of the image input and output apparatus, it becomes possible to transfer the data to the information processing apparatus capable of recognizing the prescribed removable external storage device by using a connection line, and cause the information processing apparatus to recognize the prescribed removable external storage device and transmit the data to the image input and output apparatus through a network, to thereby allow access in a simple scheme.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
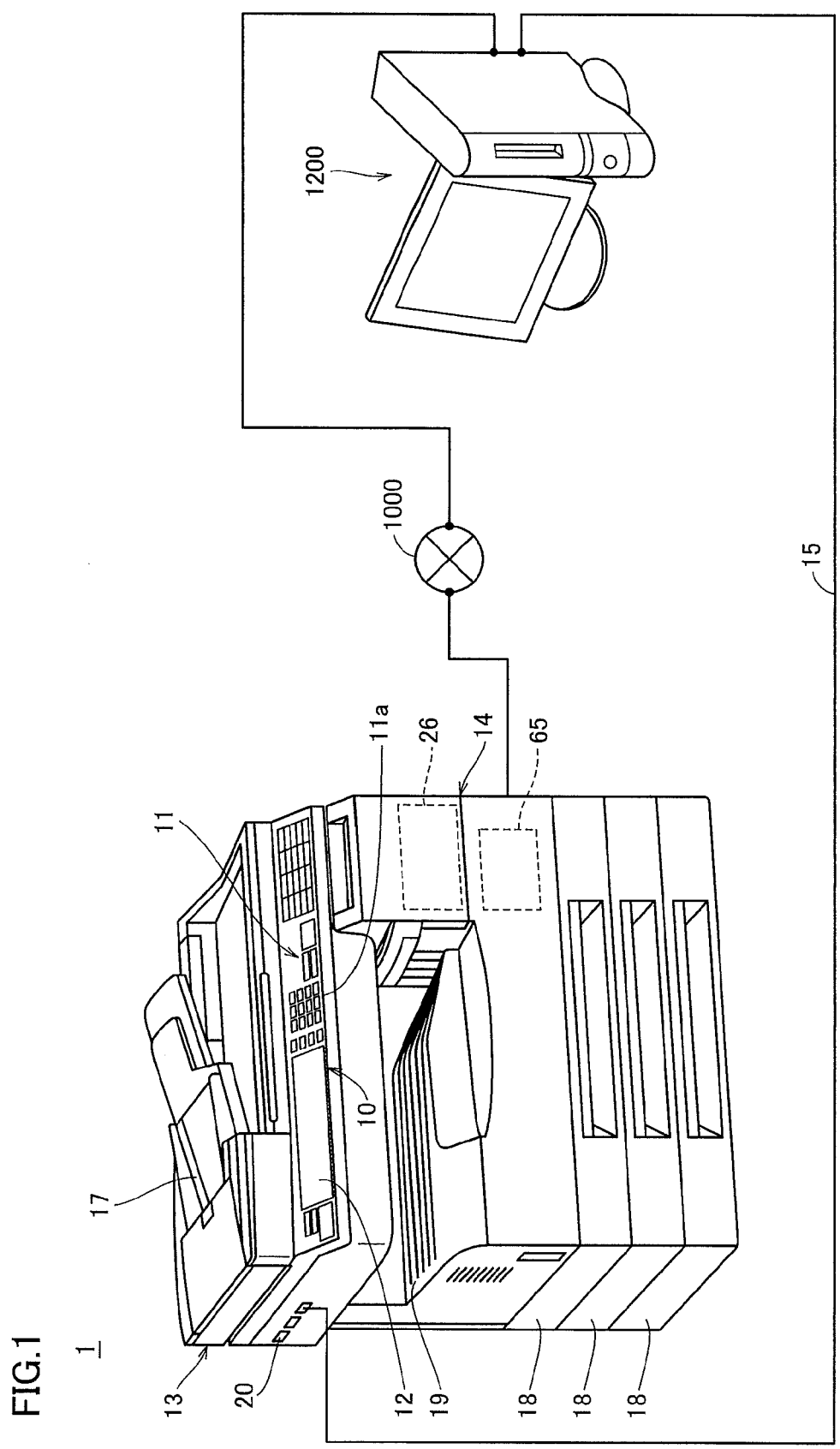
FIG. 1 is a schematic diagram of an information processing system according to an embodiment of the present invention.

The embodiments of the present invention will be hereinafter described with reference to the accompanying drawings, in which the same parts and components are designated by the same reference characters, and their names and functions are also identical.

FIG. 1 illustrates an information processing system according to an embodiment of the present invention.

Referring to FIG. 1, the information processing system according to the embodiment of the present invention includes an MFP 1 serving as an image input and output apparatus, and a PC 1200 serving as an information processing apparatus coupled to MFP 1 through a network 1000.

MFP 1 serves as a digital multifunctional machine having a copy function, a scanner function and a printer function, each of which is performed by the embedded OS. In contrast to the embedded OS in MFP 1, PC 1200 has various functions which are implemented by a general-purpose OS.

MFP 1 includes a plurality of (three in the present embodiment) ports 20 each serving as connecting means to which an external storage device complying with the USB specifications is removably attached. A USB device including a USB memory corresponding to a removable external storage device having a USB interface is connected to this port 20, so that the data can be bidirectionally transmitted and received between the external storage device and MFP 1. Port 20 is also hereinafter referred to as a USB port or a USB connector.

Although, by way of example, the case where a USB interface is used and a USB memory is connected to a port will be hereinafter described in the present example, the interface is not limited to the USB. Connection of other removable external storage devices such as a CF (Compact Flash) card is also similarly applicable. In addition, in the present example, the case where a U3® memory representing a USB memory complying with the USB specifications as a USB memory is connected to port 20 will also be described.

MFP 1 includes an operation panel 10 which has a plurality of keys 11a; an operation unit 11 for accepting input of data such as various instructions, characters and numerical characters by the user operating keys 11a; and an operation display 12 made of liquid crystal and the like for displaying an instruction menu for the user and the information regarding an obtained image.

Furthermore, MFP 1 includes a scanner 13 optically reading a document to obtain image data, and a printer 14 printing an image on a recording sheet based on the image data. A feeding unit 17 for feeding a document to scanner 13 is provided on an upper surface of a main body of MFP 1, a paper feeding unit 18 for feeding the recording sheet to printer 14 is provided in a lower section thereof, and a tray 19 for receiving the ejected recording sheet having an image printed thereon by printer 14 is provided in a central section thereof.

Furthermore, a communication interface 65 for transmitting and receiving the image data to and from external equipment, and a memory 26 for storing a control program used in each unit for controlling the main body and necessary data such as image data and the like are provided in the main body of MFP 1. It is to be noted that memory 26 also includes a PC cooperative program for performing a prescribed cooperative process with PC 1200 in accordance with the instruction from PC 1200 by executing an MFP cooperative program in PC 1200, which will be described later.

Furthermore, communication interface 65 is connected to PC 1200 which is external equipment connected to network 1000.

It is to be noted that one of the USB connectors in MFP 1 is connected through a USB connection line 15 to the USB connector in PC 1200 which is not shown.

The configuration of PC 1200 will be described later.

Operation display 12 provides display of various modes and others, and various settings and the like are carried out in accordance with displayed contents and the like. Operation unit 11 is used for various inputs by the user. These components each serve as a main part of the user interface.

Scanner 13 photoelectrically reads image information such as a photograph, a character, graphics and the like from a document to obtain image data. The obtained image data (density data) is converted into digital data which is subjected to well-known various image processes. Then, the processed data is sent to printer 14 in the case where an image is to be printed, or the processed data is transmitted through communication interface 65 to another external equipment connected to the network in the case where a image transmission process is to be performed. Alternatively, the obtained image data is stored in the USB memory in accordance with a prescribed format as will be described later.

It is to be noted that a job for storing the image data obtained by scanner 13 in the USB memory serving as a removable external storage device is also referred to as a Scan-to-USB memory job.

Printer 14 serves to print an image on a recording sheet based on the image data obtained by scanner 13, the image data stored in a USB memory or the like serving as a removable external storage device, or the image data transmitted from external equipment.

It is to be noted that a job for printing on a recording sheet based on the image data stored in the USB memory serving as a removable external storage device is also referred to as a USB memory print job.

Communication interface 65 transmits and receives data to and from PC 1200 serving as external equipment connected to network 1000 through this network 1000 such as LAN (Local Area Network) or the Internet using the public switched telephone network or the like. It is to be noted that the communication established by MFP 1 through a network may be any of wired communication and wireless communication.

Figure 2:
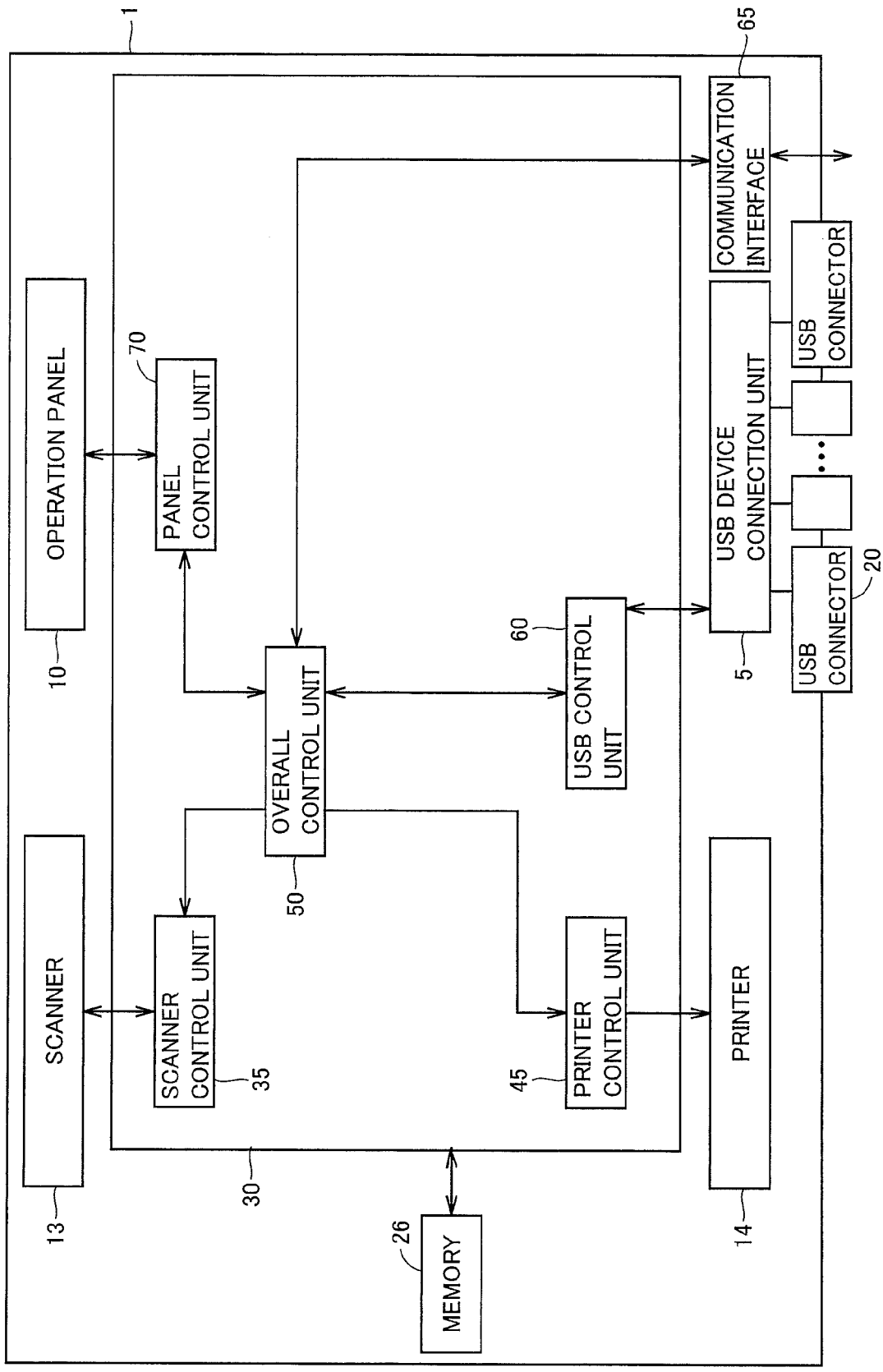
FIG. 2 is a functional block diagram of an MFP representing an image input and output apparatus according to the embodiment of the present invention.

FIG. 2 illustrates a functional block diagram of MFP 1 representing an image input and output apparatus according to the embodiment of the present invention.

Referring to FIG. 2, MFP 1 according to the embodiment of the present invention includes a scanner 13 for converting a material such as a paper medium or the like into electronic data, a memory 26 implemented, for example, by a hard disk (HDD), a printer 14 performing a printing process, a USB connector 20 for attaching each USB device, a USB device connection unit 5 for controlling connection between USB connector 20 and a USB device, an operation panel 10 including an operation display, a controller 30 for overall control of the MFP, and a communication interface 65 for transmitting and receiving data through network 1000 to and from PC 1200 serving as external equipment.

When the USB device is attached to USB connector 20, USB device connection unit 5 senses attachment, and outputs attachment information regarding the attached device to controller 30. In accordance with the instruction from a USB control unit 60, USB device connection unit 5 can also form a path directly connecting the USB connectors to each other. Specifically, by way of example, a switch for switching the path is provided within USB device connection unit 5. It can be configured such that, in the normal case, the switch electrically connected between USB control unit 60 and the USB connector is used to switch the electrically connected path in accordance with the instruction from USB control unit 60, to thereby form a path electrically connecting the USB connectors to each other.

Each functional block of controller 30 is implemented by reading an embedded OS and various software programs adapted to the embedded OS which are stored in memory 26.

Specifically, controller 30 includes a scanner control unit 35 for controlling scanner 13, a printer control unit 45 for controlling printer 14, a USB control unit 60 for accessing the USB device attached to USB connector 20 through USB device connection unit 5, a panel control unit 70 for accepting display contents to be displayed on operation panel 10 and operation input from operation panel 10, and an overall control unit 50 for providing overall control of each unit described above and instructing each unit to execute a prescribed job in response to an operation instruction input from operation panel 10. It is to be noted that overall control unit 50 functions as an embedded OS.

USB control unit 60 determines based on the information about the device attached to USB connector 20 through USB device connection unit 5 whether the device attached to USB connector 20 can be recognized or not. If the device can be recognized and accessed, USB control unit 60 outputs the information about the device to overall control unit 50. This allows the device to be accessible. Specifically, for example, when a common USB memory is recognized, operation panel 10 can issue an instruction to access the USB memory to perform the data writing process and the like for data such as image data subjected to the scanning process by scanner 13.

On the other hand, when it is determined that the device attached to USB connector 20 through USB device connection unit 5 is recognizable but inaccessible, USB control unit 60 transfers the information about the device to PC 1200 through USB connection line 15 connected to USB connector 20.

Figure 3:
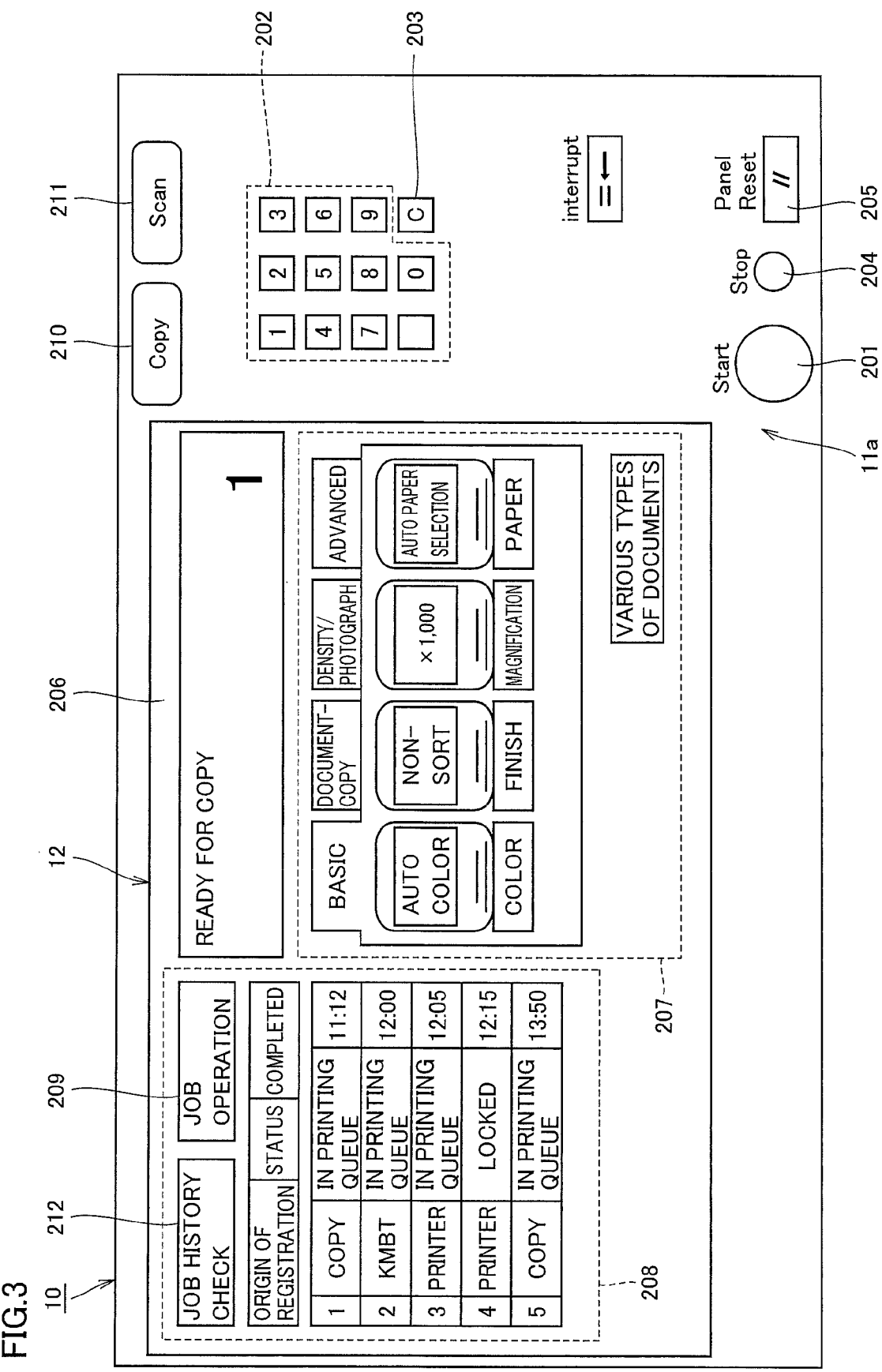
FIG. 3 is a diagram illustrating the configuration of an operation panel in the MFP according to the embodiment of the present invention.

FIG. 3 illustrates the configuration of operation panel 10 in MFP 1 according to the embodiment of the present invention.

Referring to FIG. 3, a start key 201 is used for starting an operation such as copy, scan and the like. A numeric key 202 is used for entering a numeric value and the like such as the number of copies or a password which will be described later. A clear key 203 is used for clearing an entered numeric value and erasing the stored image data.

A stop key 204 is used for providing an instruction to stop the copy/scan operation. A panel reset key 205 is used for canceling the mode and the job that have been set. Furthermore, when stop key 204 is pressed during the process of writing data into the USB device or during the process of printing of data, the operation of writing data into the USB device or the operation of printing the data is stopped.

Operation display 12 is provided with a touch panel 206 for displaying and setting various modes, and the like.

Through this touch panel 206, the user can make various settings in accordance with contents displayed on operation display 12. In addition, touch panel 206 has a setting screen area 207 in which, normally, buttons for basic/advanced setting that is made in a copy operation or a scanning operation are arranged. When each of the buttons is pressed, a screen layer used for making detailed setting is displayed.

In a job information screen area 208 of touch panel 206, the job information provided to MFP 1 by that time point is displayed. Jobs are displayed in the order of execution. When an operation for canceling or modifying a specific job is to be performed, a job operation button 209 is selected, and then, a job number button representing the job to be executed is pressed. Through these operations, a job operation screen is displayed to allow the operation for a specific job to be performed. In addition, when a job history check button 212 is pressed, the history of the executed job can be checked.

A copy key 210 and a scan key 211 each serve as a selection key for setting MFP 1 to be operated in any mode of a copier and a scanner.

When copy key 210 is pressed, MFP 1 can be used as a copier. In this state, a scanning operation cannot be performed.

Alternatively, when scan key 211 is pressed, MFP 1 functions as a scanner. In this state, a copy operation cannot be performed.

It is to be noted that copy key 210 and scan key 211 are mutually exclusive. Thus, if one of the keys is selected, the other of the keys is automatically brought into a non-selectable state.

Figure 4:
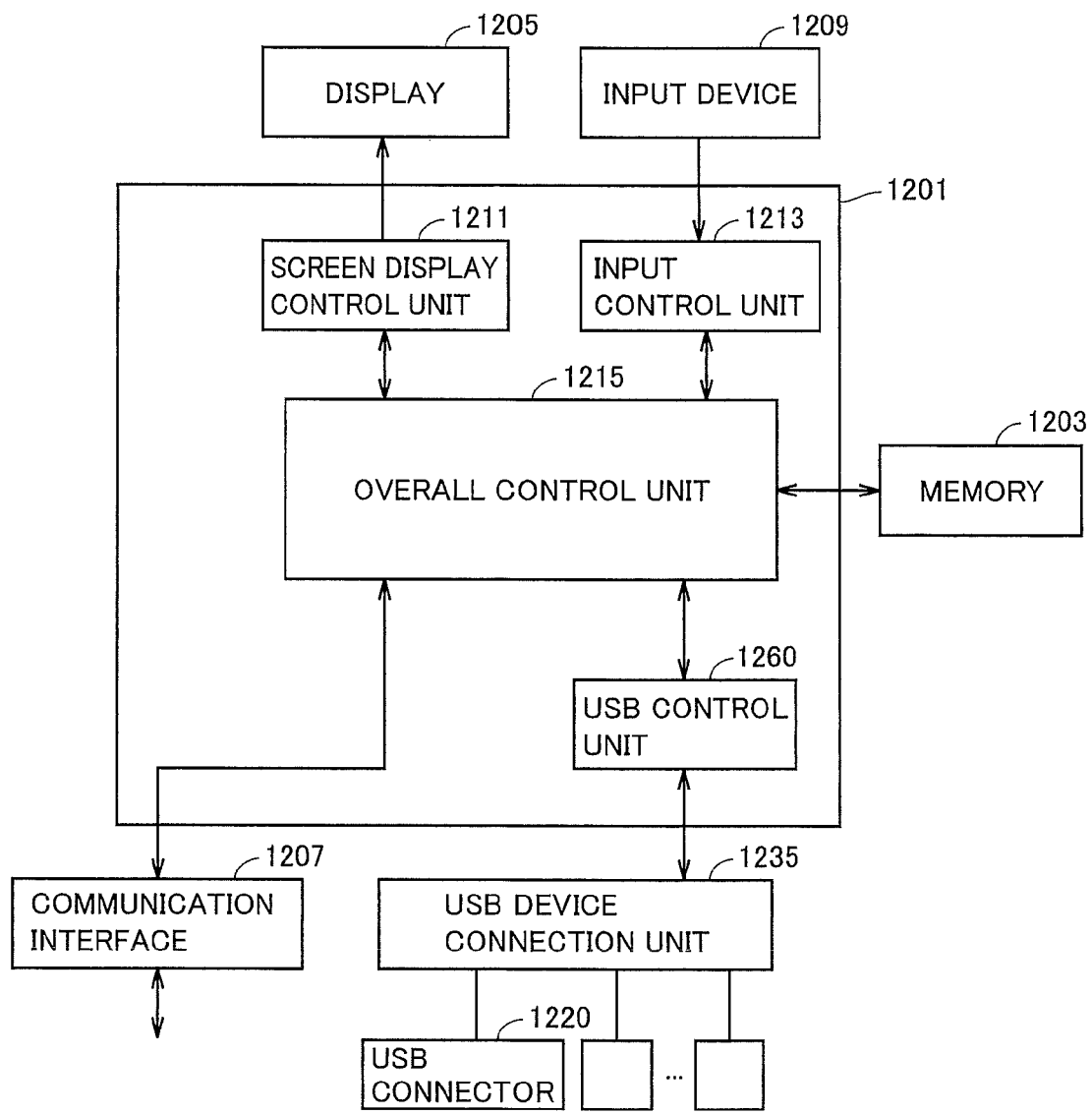
FIG. 4 is a functional block diagram of a PC according to the embodiment of the present invention.

FIG. 4 illustrates a functional block diagram of PC 1200 according to the embodiment of the present invention.

Referring to FIG. 4, PC 1200 according to the embodiment of the present invention includes an input device 1209 such as a mouse or a keyboard, a display 1205 for displaying an operation display screen, a communication interface 1207 for transmitting and receiving data to and from outside through network 1000, a memory 1203 implemented, for example, by a hard disk (HDD), a USB connector 1220 serving as a port for connecting, for example, a USB memory which is a removable external storage device, a USB device connection unit 1235 for controlling connection between USB connector 1220 and a USB device, and a controller 1201 for providing overall control of PC 1200.

When the USB device is attached to USB connector 1220, USB device connection unit 1235 senses attachment, and outputs the attachment information regarding the attached device to controller 1201.

Each functional block in controller 1201 is implemented by reading a general-purpose OS and various software programs adapted to the general-purpose OS that are stored in memory 1203. It is to be noted that the MFP cooperative program used for a process in cooperation with MFP 1 is also stored in memory 1203.

Specifically, controller 1201 includes a USB control unit 1260 for accessing the USB device attached to USB connector 1220 through USB device connection unit 1235, an input control unit 1213 for accepting an operation input through input device 1209, and a screen display control unit 1211 for controlling the display processing or the like of display 1205. It is to be noted that an overall control unit 1215 functions as a general-purpose OS.

USB control unit 1260 determines based on the information about the device attached to USB connector 1220 through USB device connection unit 1235 whether the device attached to USB connector 1220 is recognizable or not. If it is determined that the device is recognizable and accessible, USB control unit 1260 outputs the information about the device to overall control unit 1215. Specifically, for example, when a common USB memory is recognized, an instruction or the like to access the USB memory can be provided through input device 1209 while viewing the operation display screen displayed on display 1205.

Figure 5:
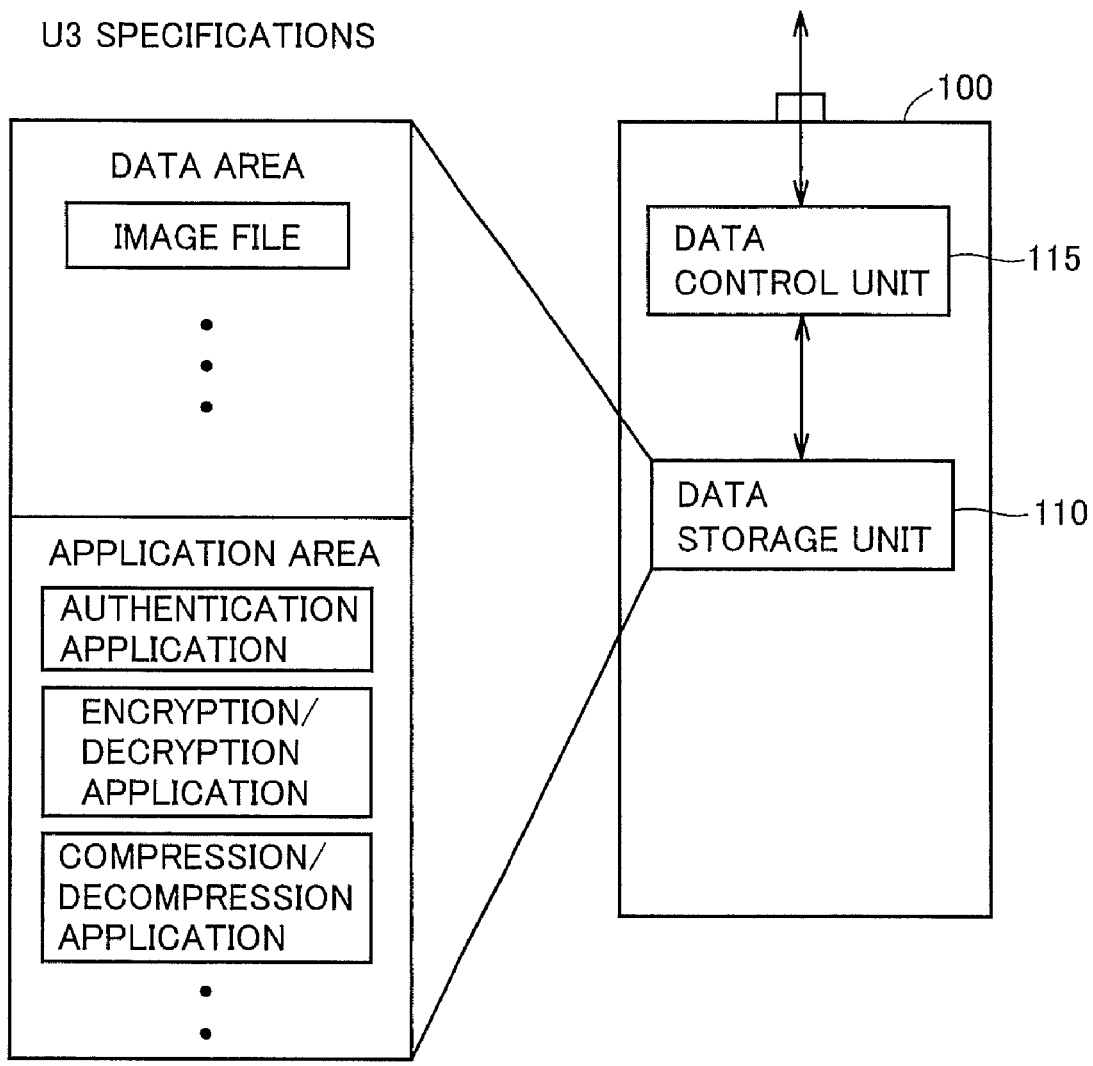
FIG. 5 is a schematic diagram illustrating the configuration of a U3® memory according to the embodiment of the present invention.

FIG. 5 illustrates the configuration of a U3® memory according to the embodiment of the present invention.

Referring to FIG. 5, in the present example, a USB memory complying with the U3® specifications will be described by way of example. A USB memory 100 complying with the U3® specifications includes a data storage unit 110 in which data is stored, and a data control unit 115 for performing data reading or data writing for data stored in data storage unit 110 in accordance with the instruction. Data storage unit 110 is divided into a data area and an application area. As described above, the application area can store the application complying with the U3® specifications. In this case, an example in which an authentication application is stored is herein described. In addition, by way of example, other applications are described which include an encryption/decryption application capable of encrypting the image data to store the same in the data area or decrypting the encrypted data, and a compression/decompression application capable of compressing the image data to store the same in the data area or decompressing the compressed data. It is to be noted that the application for the data in each USB memory described above is also referred to as a USB memory cooperative application.

Furthermore, when sensing attachment to the connector, data control unit 115 outputs the data control information regarding the USB memory.

Furthermore, in the present example, data control unit 115 receives an input of a filename list request instruction command described later, to output the filename stored in the data area to the outside. Data control unit 115 also receives an input of a file data request instruction command described later, to output the file data having the designated filename stored in the designated data area to the outside. Data control unit 115 receives an input of a scan data writing request instruction command described later and stores the scan data in the data area (data writing).

Furthermore, the application in the USB memory complying with the U3® specifications is not adapted to an embedded OS but adapted to a general-purpose OS. In other words, the application described herein can be executed by PC 1200.

Figure 6:
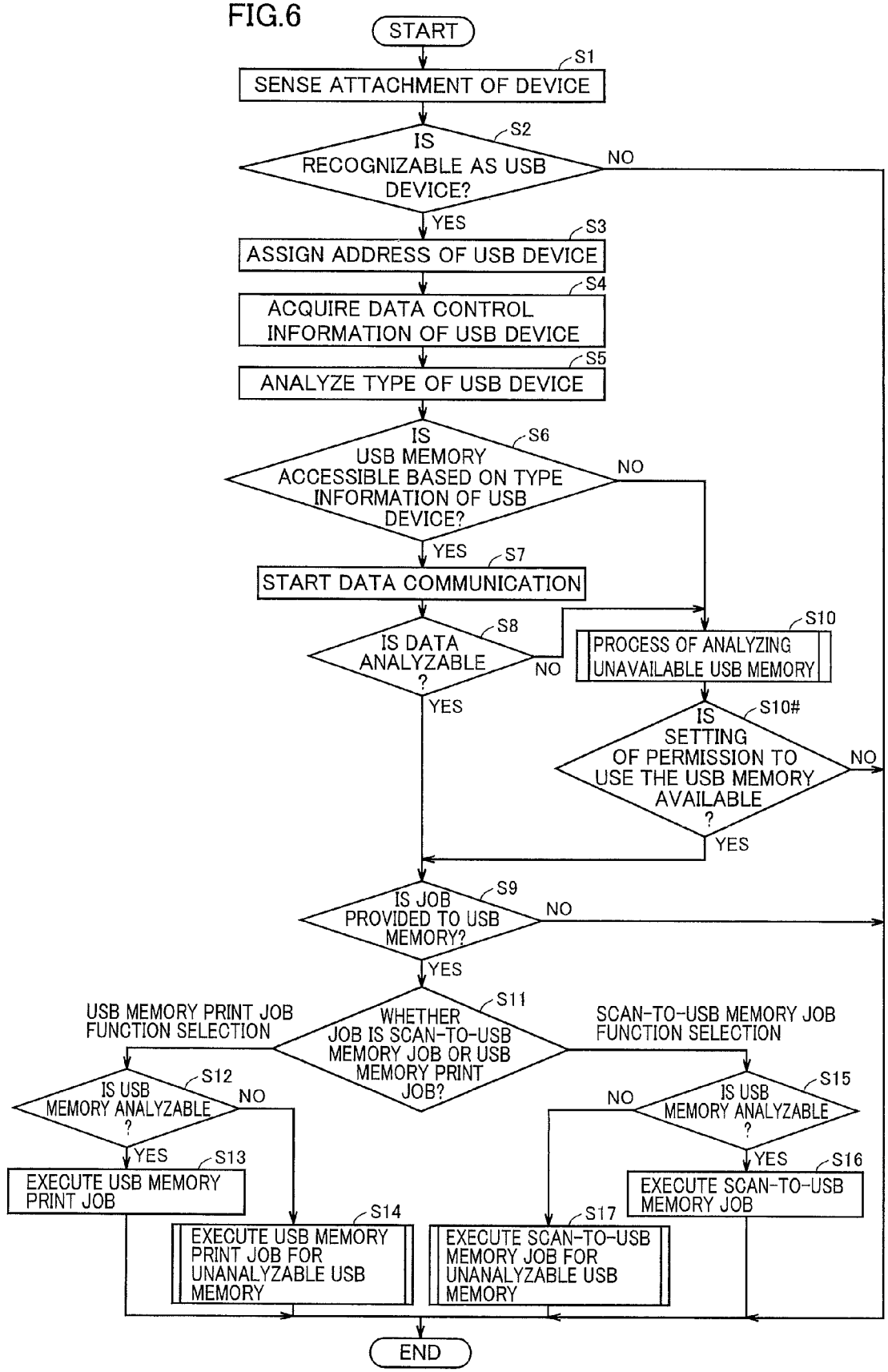
FIG. 6 is a flowchart illustrating the process when executing a job for the USB memory as a USB device attached to the MFP according to the embodiment of the present invention.

FIG. 6 illustrates the process when executing a job for the USB memory as a USB device attached to MFP 1 according to the embodiment of the present invention.

Referring to FIG. 6, attachment of the device is first sensed (step S1). Specifically, USB device connection unit 5 senses attachment of the device (U3® memory) attached to USB connector 20. Then, USB control unit 60 receives an input of the sensing information from USB device connection unit 5 to determine whether the attached device (U3® memory) can be recognized as a USB device through USB device connection unit 5 (step S2). In step S2, if the device attached to USB connector 20 cannot be recognized as a USB device, USB control unit 60 ends the process (end).

On the other hand, in step S2, when the device attached to USB connector 20 can be recognized as a USB device, USB control unit 60 assigns an address to the attached USB device (step S3).

USB control unit 60 then acquires data control information which is output from the USB device through USB device connection unit 5 (step S4). Specifically, USB control unit 60 acquires the data control information such as type information of the USB device (vendor identification (ID), product ID, and the like), the number of interfaces, a device class, the number of end descriptors, and protocol information, and the like.

Then, the type of the USB device is analyzed based on the data control information output from the USB device (step S5). The present example mainly represents the case where a USB memory corresponding to a U3® memory is attached as a USB device.

USB control unit 60 then determines based on the type information of the USB device whether the attached USB device is an accessible USB memory or not (step S6). Specifically, USB control unit 60 determines whether the type information of the USB device included in the data control information is registered in memory 26 as an accessible USB memory. If the type information is registered, USB control unit 60 determines that the USB device is accessible. If the type information is not registered, USB control unit 60 determines that the USB device is inaccessible.

In step S6, if it is determined that the attached USB device is an accessible USB memory, that is, if initial connection is completed, data communication is started (step S7). Specifically, USB control unit 60 accesses the accessible USB memory and outputs the data stored in the USB memory to overall control unit 50.

Then, it is determined whether the data is analyzable or not (step S8). Specifically, overall control unit 50 determines whether the data in the USB memory input through USB control unit 60 is analyzable or not, for example, whether the data is subjected to data conversion by an encryption process or the like.

When determining that the data is analyzable, overall control unit 50 determines that the USB device is a common USB memory, and then determines whether a job is provided to the USB memory (step S9).

In step S9, when the job is provided to the USB memory, overall control unit 50 determines whether the job is a Scan-to-USB memory job or a USB memory print job (step S11).

In step S11, if the job is a USB memory print job, overall control unit 50 determines whether the USB device is an analyzable USB memory (step S12).

In step S12, when determining that the USB device is an analyzable USB memory, overall control unit 50 executes the USB memory print job (step S13). Then, the process ends.

On the other hand, in step S12, when determining that the USB device is an unanalyzable USB memory, overall control unit 50 executes the USB memory print job for the unanalyzable USB memory (step S14), and the process ends.

In step S11, when the job is a Scan-to-USB memory job, overall control unit 50 determines whether the USB device is an analyzable USB memory (step S15).

In step S15, when determining that the USB device is an analyzable USB memory, overall control unit 50 executes the Scan-to-USB memory job (step S16), and the process ends.

On the other hand, in step S15, when determining that the USB device is an unanalyzable USB memory, overall control unit 50 executes a Scan-to-USB memory job for the unanalyzable USB memory (step S17), and the process ends.

In step S6, when it is determined that the attached USB device is an inaccessible USB memory, a process of analyzing the unavailable USB memory is performed (step S10). The process of analyzing the unavailable USB memory will be described later.

In step S8, when determining that the data is unanalyzable, a process of analyzing the unavailable USB memory is performed (step S10). It is to be noted that, when determining that the data is unanalyzable, overall control unit 50 notifies USB control unit 60 that the data is unanalyzable.

After the process of analyzing the unavailable USB memory, overall control unit 50 determines whether setting of permission to use the USB memory is available (step S10#).

In step S10#, when setting of permission to use the USB memory is available, the USB memory is set to be accessible and brought into a selectable state on operation display 12. The process then proceeds to step S9. On the other hand, in step S10#, when it is determined that setting of permission to use the USB memory is not available, the process ends (end).

Figure 7:
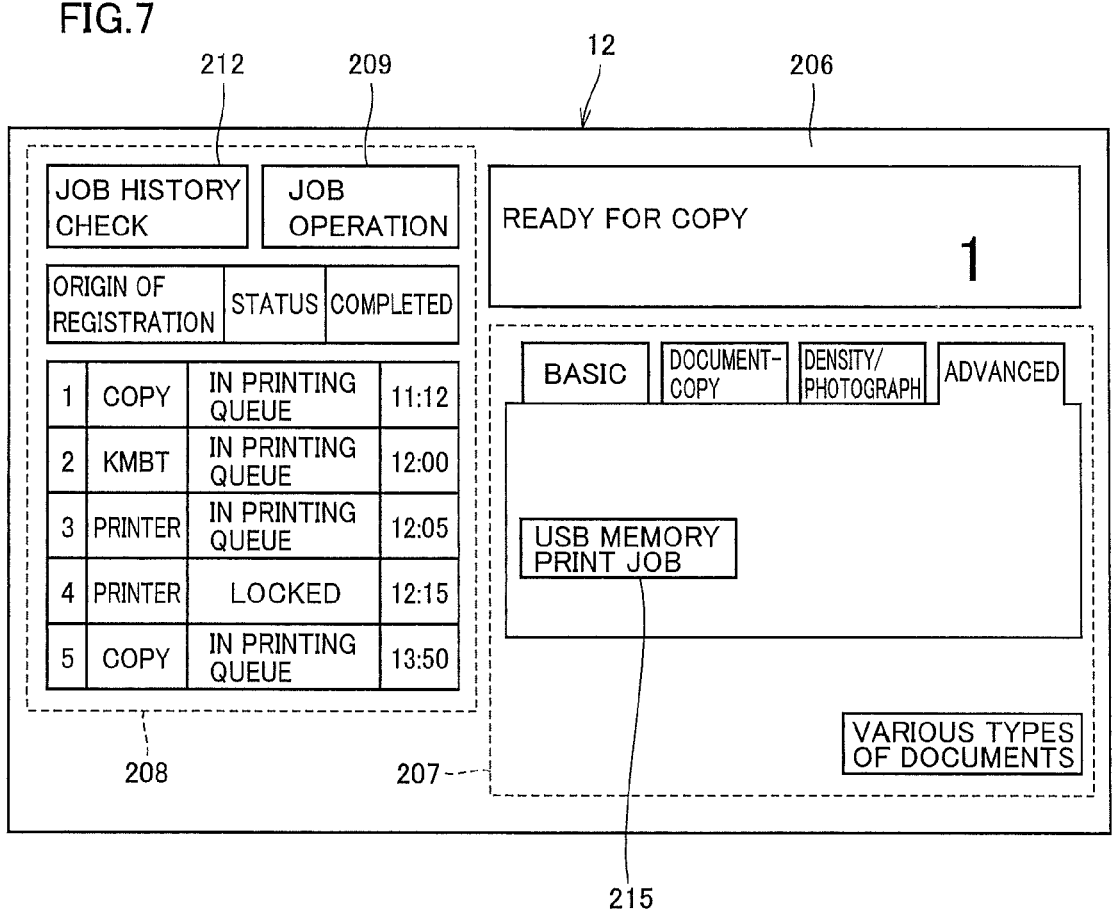
FIG. 7 is a diagram illustrating execution of a USB memory print job on an operation display according to the embodiment of the present invention.

FIG. 7 illustrates execution of the USB memory print job on operation display 12 according to the embodiment of the present invention.

FIG. 7 shows the case where, when an advanced tab button is pressed in the copy mode, an execution button 215 labeled as a "USB memory print job" is displayed. As execution button 215 is pressed, an instruction to execute the function of the USB memory print job is selected. Then, transition to the screen for selecting the next USB memory is made.

Figure 8:
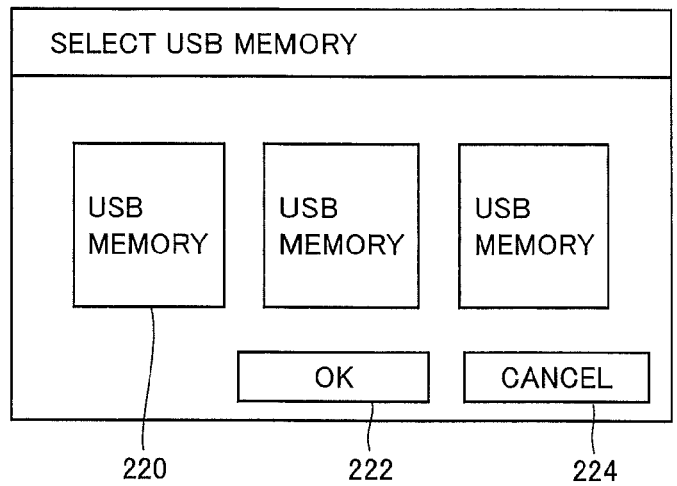
FIG. 8 is a diagram of a screen for selecting the USB memory.

FIG. 8 illustrates the screen for selecting the USB memory.

FIG. 8 shows the screen on which a plurality of USB memories can be selected corresponding to a plurality of USB connectors 20, respectively, and also shows buttons 220 for selecting the USB memories, respectively. The present example shows the case where three USB memories can be selected corresponding to USB connectors 20, respectively, by way of example. As one of the buttons is selected to press an "OK" button, the function of the USB memory print job for the selected USB memory can be carried out.

Figure 9:
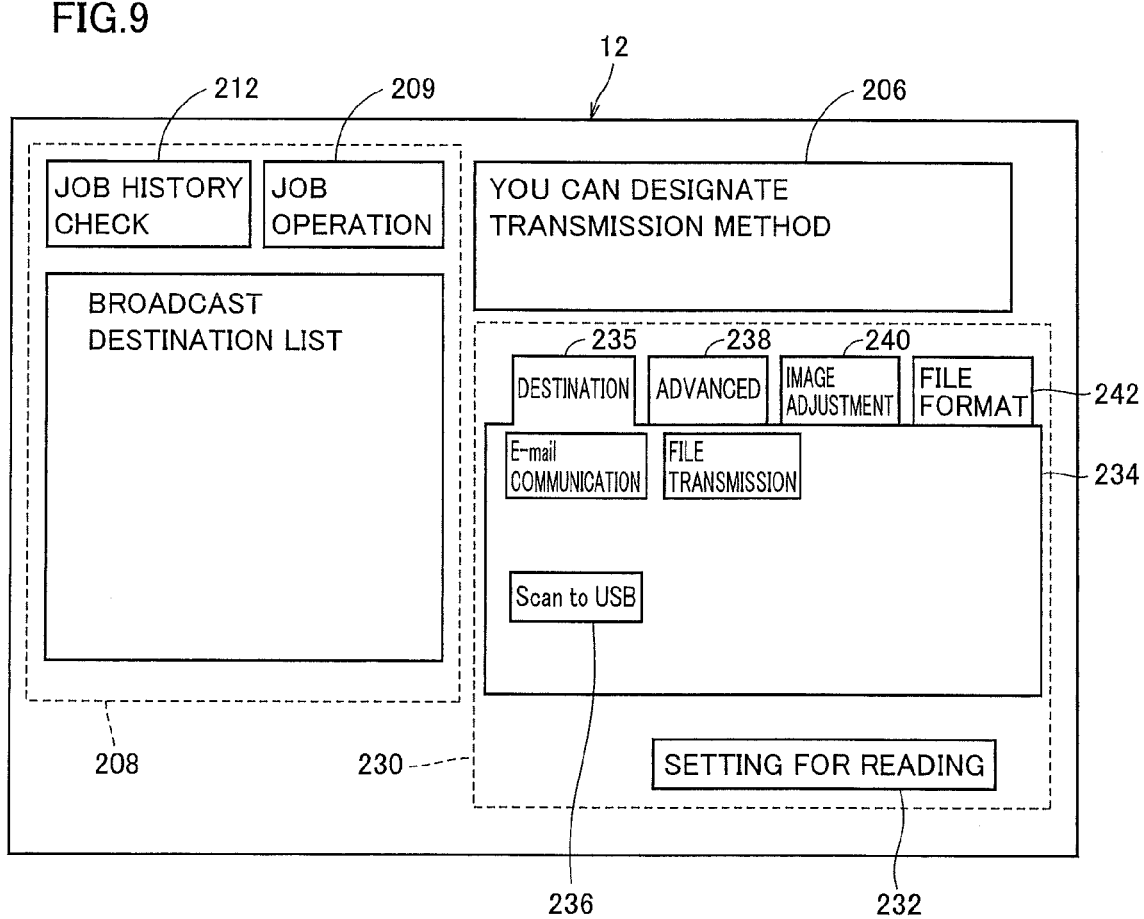
FIG. 9 is a diagram illustrating execution of a Scan-to-USB memory job on the operation display according to the embodiment of the present invention.

FIG. 9 illustrates execution of a Scan-to-USB memory job on operation display 12 according to the embodiment of the present invention.

FIG. 9 shows the case where, when the tab button labeled as a destination is pressed in the scan mode, an execution button 236 labeled as "Scan to USB" is displayed. As execution button 236 is pressed, the function of the Scan-to-USB memory job is selected. Then, transition to the screen for selecting the USB memory described in FIG. 8 is made.

Also in the present example, the selection of the USB memory allows execution of the function of the Scan-to-USB memory job for the selected USB memory.

Figure 10:
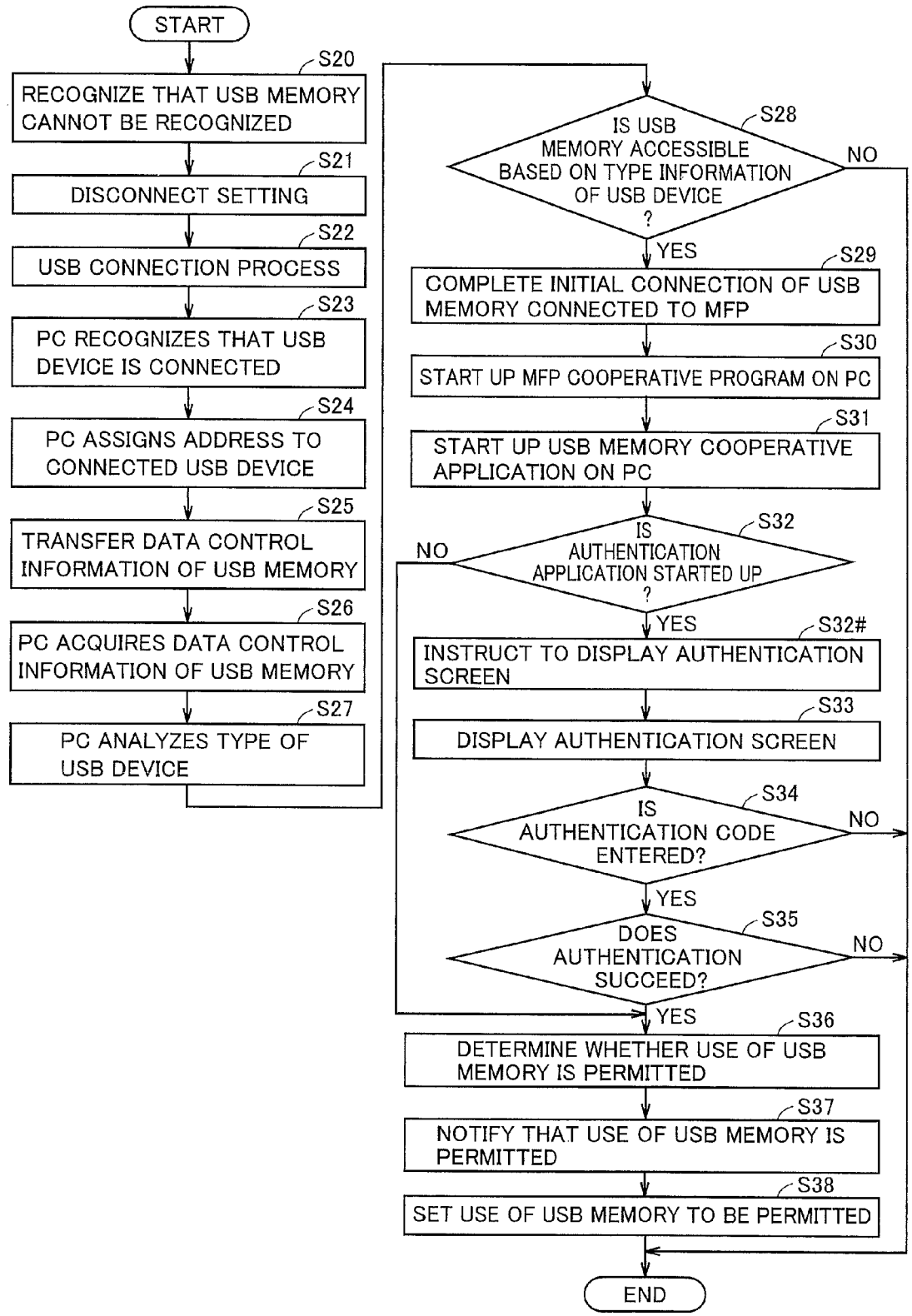
FIG. 10 is a flowchart illustrating a process of analyzing an unavailable USB memory according to the embodiment of the present invention.

FIG. 10 illustrates a process of analyzing the unavailable USB memory according to the embodiment of the present invention.

Referring to FIG. 10, based on the type information of the USB device or on the unanalyzable state due to the data conversion by the encryption process or the like, USB control unit 60 recognizes that the attached USB memory is an unanalyzable USB memory (step S20).

Then, disconnect setting is made (step S21). Specifically, USB control unit 60 recognizes that the USB memory is unanalyzable, and disconnects the data communication between overall control unit 50 and USB control unit 60.

The USB connection process is then carried out (step S22). Specifically, USB control unit 60 instructs PC 1200 serving as an information processing apparatus through USB connection line 15 to establish USB connection.

USB connection line 15 connects USB connector 20 of MFP 1 and USB connector 1220 of PC 1200. As with USB control unit 60 described above, USB control unit 1260 of PC 1200 receives an input of the sensing information from USB device connection unit 1235 and recognizes that connection to the USB device is established (step S23).

USB control unit 1260 of PC 1200 assigns an address to the connected USB device (step S24).

USB control unit 60 of MFP 1 then transfers the data control information output from the USB memory through USB connection line 15 (step S25). Specifically, as described above, the data control information such as type information of the USB device (Vendor ID, product ID and the like), the number of interfaces, a device class, the number of end descriptors, and protocol information is transferred.

USB control unit 1260 of PC 1200 then acquires the data control information of the USB memory that is USB-connected through USB device connection unit 1235 (step S26).

USB control unit 1260 of PC 1200 analyzes the type of the USB device based on the data control information output from the USB memory (step S27).

Based on the type information of the USB device in accordance with the results of analyzing the type of USB device, USB control unit 1260 of PC 1200 then determines whether the attached USB device is an accessible USB memory (step S28). In step S28, when it is determined that the USB device is inaccessible, the process ends (end).

In step S28, when USB control unit 1260 of PC 1200 determines that the USB device is an accessible MFP, overall control unit 1215 of PC 1200 completes the initial connection of the USB memory connected to the MFP (step S29). This causes the data communication to be started.

The MFP cooperative program is started up on PC 1200 (step S30). In this case, the MFP cooperative program serves as an application program which is stored in memory 1203 in advance, and when started up, carries out the process in cooperation with the MFP. The MFP cooperative program may be started up after completing the initial connection or prior thereto.

The USB memory cooperative application is then started up on PC 1200 (step S31). Specifically, after completing the initial connection to the USB memory connected to the MFP, overall control unit 1215 of PC 1200 instructs USB control unit 60 of MFP 1 through USB connection line 15 to access the U3® memory. USB control unit 60 then accesses the U3® memory to acquire the USB memory cooperative application stored in the U3® memory, and transmits the application to PC 1200 through USB connection line 15. USB control unit 1260 of PC 1200 outputs the USB memory cooperative application received through USB connection line 15 to overall control unit 1215. Overall control unit 1215 receives the USB memory cooperative application output from the USB memory through USB control unit 1260, and starts up the application.

Overall control unit 1215 of PC 1200 then determines whether the authentication application included in the USB memory cooperative application is started up (step S32). Specifically, overall control unit 1215 of PC 1200 determines by the MFP cooperative program whether the authentication application included in the USB memory cooperative application is started up or not.

In step S32, when determining by the MFP cooperative program that the authentication application is not included in the USB memory cooperative application and not started up, overall control unit 1215 of PC 1200 determines that use of the USB memory can be permitted since the authentication process is not particularly required for the USB memory (step S36).

Overall control unit 1215 of PC 1200 notifies MFP 1 by the MFP cooperative program through network 1000 that use of the USB memory can be permitted (step S37).

Then, overall control unit 50 of MFP 1 receives notification by the MFP cooperative program through communication interface 65 connected to network 1000 that use of the USB memory can be permitted, and uses the PC cooperative program to set use of the USB memory to be permitted (step S38). For example, this setting process allows execution of the function of the USB memory print job or Scan-to-USB memory job described later for the U3® memory that is unanalyzable.

On the other hand, in step S32, when determining by the MFP cooperative program that the authentication application is included in the USB memory cooperative application and is started up, overall control unit 1215 of PC 1200 instructs MFP 1 by the PC cooperative program through network 1000 to display an authentication screen on operation display 12 of MFP 1 (step S32#).

Overall control unit 50 of MFP 1 then receives, through communication interface 65 connected to network 1000, the instruction by the MFP cooperative program to display the authentication screen, and displays the authentication screen stored in memory 26 in advance by the PC cooperative program (step S33).

Figure 11:
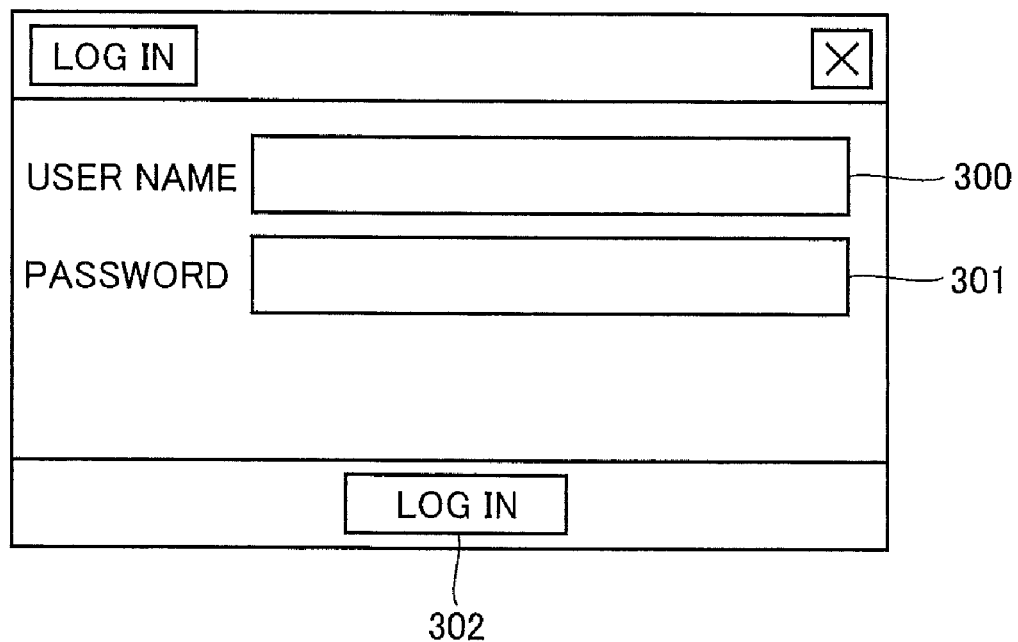
FIG. 11 is an exemplary diagram of an authentication screen displayed on the operation display of the MFP.

FIG. 11 illustrates an example of the authentication screen displayed on operation display 12 of MFP 1.

Referring to FIG. 11, an authentication screen is displayed by the PC cooperative program on operation display 12 of MFP 1, in which a column 300 in which a user name is entered and a column 301 in which a password is entered are provided. The user operates the touch panel and presses a "log-in" button 302 to allow execution of the authentication process for the user name and password each corresponding to an authentication code.

Although the scheme in which a user name and a password each are entered as an authentication code has been described in the present example, the authentication code is not limited thereto. Only a password may be entered or biometric authentication and the like may also be applied.

Referring again to FIG. 10, overall control unit 50 of MFP 1 determines whether the authentication code of the user is entered into the authentication screen displayed on operation display 12 of MFP 1 by the user operating operation panel 10 (step S34). Specifically, the determination is made based on whether a user name and a password each serving as an authentication code are entered into the above-described authentication screen and "log-in" button 302 is pressed by the operation on the touch panel.

In step S34, in the case where the authentication code is entered into the authentication screen displayed on operation display 12 of MFP 1 by the user operating operation panel 10, that is, the case where a user name and a password each serving as an authentication code are entered into the above-described authentication screen and "log-in" button 302 is pressed by the operation on the touch panel, overall control unit 50 outputs the entered authentication code to communication interface 65. Communication interface 65 transmits the authentication code to PC 1200 through network 1000.

Communication interface 1207 of PC 1200 receives the authentication code from communication interface 65 and outputs the code to overall control unit 1215.

Overall control unit 1215 determines based on the authentication code received from communication interface 1207 whether the authentication code is identified, that is, the authentication succeeds, in the started-up authentication application included in the USB memory cooperative application (step S35).

In step S35, when it is determined that the authentication succeeds by the started-up authentication application, it is determined that use of the USB memory can be permitted (step S36).

As described above, overall control unit 1215 of PC 1200 notifies MFP 1 by the MFP cooperative program through network 1000 that use of the USB memory is permitted (step S37).

Then, overall control unit 50 of MFP 1 receives notification by the MFP cooperative program through communication interface 65 connected to network 1000 that use of the USB memory can be permitted, and uses the PC cooperative program to set use of the USB memory to be permitted (step S38). For example, this setting process allows execution of the function of the USB memory print job or Scan-to-USB memory job described later for the U3® memory which is an unanalyzable USB memory.

Specifically, when the function of the USB memory print job or Scan-to-USB memory job is executed, the USB memory that is determined as being unanalyzable can also be selected on the screen for selecting the USB memory described in FIG. 8.

On the other hand, when the authentication code is not entered in step S34 or when the authentication does not succeed in step S35, it is determined that access is not permitted. Then, the process ends (end).

In that case, when the function of the USB memory print job or Scan-to-USB memory job is executed, it is assumed that the USB memory determined as being unanalyzable is set to be in the non-selectable state on the screen for selecting the USB memory described in FIG. 8.

Figure 12:
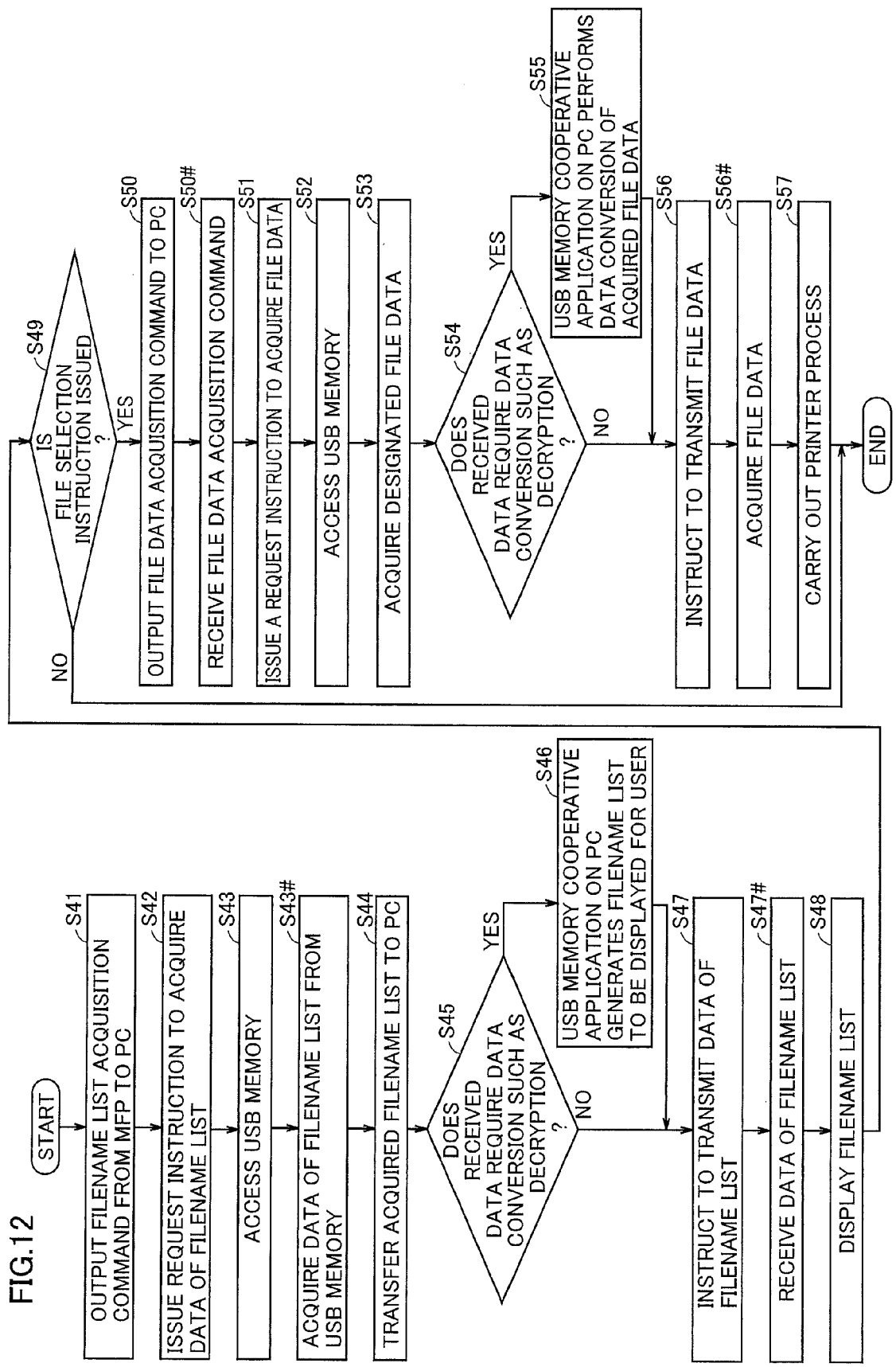
FIG. 12 is a diagram illustrating a process flow when executing the USB memory print job for an unanalyzable USB memory according to the embodiment of the present invention.

FIG. 12 illustrates a process flow when executing the USB memory print job for the unanalyzable USB memory according to the embodiment of the present invention.

Referring to FIG. 12, a filename list acquisition command is output from MFP 1 to PC 1200 (step S41). Specifically, execution button 215 of the USB memory print job is pressed as described in FIG. 7 and selection button 220 of the USB memory is pressed in FIG. 8. In this case, if it is determined that the selected USB memory is unanalyzable, overall control unit 50 outputs a filename list acquisition command through communication interface 65 to PC 1200 by the PC cooperative program.

Communication interface 1207 of PC 1200 receives the filename list acquisition command transmitted by communication interface 65 of MFP 1 through network 1000 (step S41#). Communication interface 1207 of PC 1200 outputs the filename list acquisition command to overall control unit 1215.

Overall control unit 1215 of PC 1200 issues a request instruction to USB control unit 1260 to access the USB memory and acquire the data of the filename list (step S42).

USB control unit 1260 then accesses the USB memory through USB connection line 15 in accordance with the instruction from overall control unit 1215 (step S43).

Overall control unit 1215 of PC 1200 acquires the data of the filename list from the USB memory (step S43#).

Specifically, USB control unit 1260 transmits the filename list request instruction command to the USB memory through USB connection line 15. USB control unit 60 transfers, to the USB memory, the filename list request instruction command transmitted from USB control unit 1260 through USB connection line 15 (step S44).

The USB memory outputs the data of the filename list to USB control unit 60 in accordance with the filename list request instruction command.

USB control unit 60 transfers, through USB connection line 15, the data of the filename list transmitted from the USB memory. USB control unit 1260 of PC 1200 acquires the data of the filename list transferred through USB connection line 15. USB control unit 1260 outputs, to overall control unit 1215, the data of the filename list received from the selected USB memory.

Overall control unit 1215 determines whether the data of the filename list received through USB connection line 15 requires data conversion such as decryption (step S45). For example, if the data is encrypted, the data is required to be subjected to a decryption process. Furthermore, if the data is compressed, the data is required to be subjected to a decompression process.

In step S45, when overall control unit 1215 determines that the received data requires data conversion such as decryption, the USB memory cooperative application started up on PC 1200 generates data of the filename list which can be displayed for the user on operation display 12 (step S46). Specifically, if the data is encrypted, the data of the filename list that is data converted by a decryption process and can be displayed is generated based on the encryption/decryption application included in the USB memory cooperative application and capable of decrypting the encrypted data. Alternatively, if the data is compressed, the data of the filename list that is data converted by a decompression process and can be displayed is generated based on the compression/decompression application included in the USB memory cooperative application and capable of decompressing the compressed data.

Overall control unit 1215 of PC 1200 then instructs communication interface 1207 by the started-up MFP cooperative program to transmit the data of the filename list to MFP 1 through network 1000 (step S47).

Communication interface 65 of MFP 1 receives the data of the filename list transmitted from communication interface 1207 of PC 1200 (step S47#). Communication interface 65 then outputs the data of the filename list to overall control unit 50 of MFP 1.

Overall control unit 50 of MFP 1 acquires the data of the filename list transmitted from PC 1200 through communication interface 65, and displays the filename list on operation display 12 (step S48).

Figure 13:
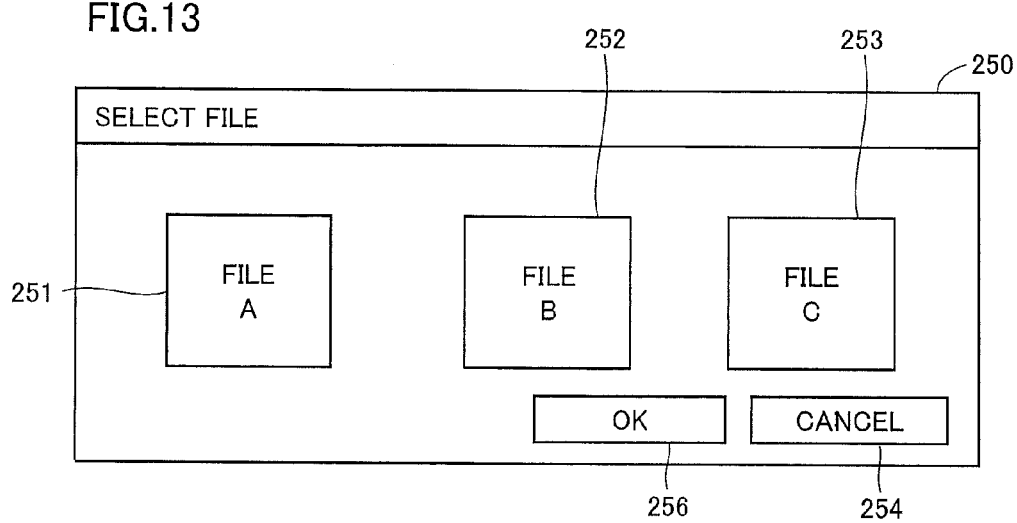
FIG. 13 is a diagram of a file selection screen according to the embodiment of the present invention.

FIG. 13 illustrates a file selection screen according to the embodiment of the present invention.

FIG. 13 shows the case where, based on the received data of the filename list, a file selection screen 250 is displayed on operation display 12 of MFP 1 by the PC cooperative program. In the present example, selection buttons 251, 252 and 253 are provided corresponding to three filenames A, B and C, respectively, representing each data in the filename list.

As one of these selection buttons is selected to press an "OK" button 256, an instruction to select the file corresponding to the selected filename is issued. When a "cancel" button 254 is pressed, the process ends.

Referring again to FIG. 12, overall control unit 50 determines whether a file selection instruction is issued, on file selection screen 250 (step S49).

In step S49, when it is determined that a file selection instruction is issued, overall control unit 50 of the MFP outputs a file data acquisition command by the PC cooperative program from communication interface 65 through network 1000 to PC 1200 (step S50).

Communication interface 1207 of PC 1200 receives the file data acquisition command transmitted from communication interface 65 of MFP 1 through network 1000 (step S50#). Communication interface 1207 of PC 1200 outputs the file data acquisition command to overall control unit 1215.

In accordance with the file data acquisition command, overall control unit 1215 of PC 1200 issues a request instruction to USB control unit 1260 to access the USB memory and acquire the designated file data (step S51).

In accordance with the instruction from overall control unit 1215, USB control unit 1260 accesses the USB memory through USB connection line 15 (step S52).

Overall control unit 1215 of PC 1200 acquires the designated file data from the USB memory (step S53).

Specifically, USB control unit 1260 transmits a file data request instruction command to the USB memory through USB connection line 15. USB control unit 60 transfers, to the USB memory, the file data request instruction command transmitted from USB control unit 1260 through the USB connection line.

In accordance with the file data request instruction command, the USB memory outputs the stored file data to USB control unit 60.

Through USB connection line 15, USB control unit 60 transfers the designated file data transmitted from the USB memory. USB control unit 1260 of PC 1200 acquires the designated file data which is transferred through USB connection line 15. USB control unit 1260 outputs the designated file data to overall control unit 1215.

Overall control unit 1215 determines whether the file data received through USB connection line 15 requires data conversion such as decryption (step S54). For example, if the data is encrypted, the data is required to be subjected to a decryption process. Furthermore, if the data is compressed, the data is required to be subjected to a decompression process.

In step S54, when overall control unit 1215 determines that the received data requires data conversion such as decryption, the USB memory cooperative application started up on PC 1200 performs data conversion of the acquired file data (step S55). The process then proceeds to step S56. Specifically, if the data is encrypted, the file data that is data converted by a decryption process is generated based on the encryption/decryption application included in the USB memory cooperative application and capable of decrypting the encrypted data. Alternatively, if the data is compressed, the file data that is data converted by a decompression process is generated based on the compression/decompression application included in the USB memory cooperative application and capable of decompressing the compressed data.

Overall control unit 1215 of PC 1200 then instructs communication interface 1207 by the started-up MFP cooperative program to transmit the file data to MFP 1 through network 1000 (step S56).

Overall control unit 50 of MFP 1 acquires the file data transmitted from PC 1200 through communication interface 65, and outputs the file data to a printer control unit 45 (step S56#).

Printer control unit 45 of MFP 1 receives the file data output from overall control unit 50 to carry out a printer process (step S57).

Specifically, printer control unit 45 prints an image on the recording sheet in printer 14, and the process ends.

Accordingly, the scheme as described above allows execution of the USB memory print job for the file data stored in the U3® memory.

Figure 14:
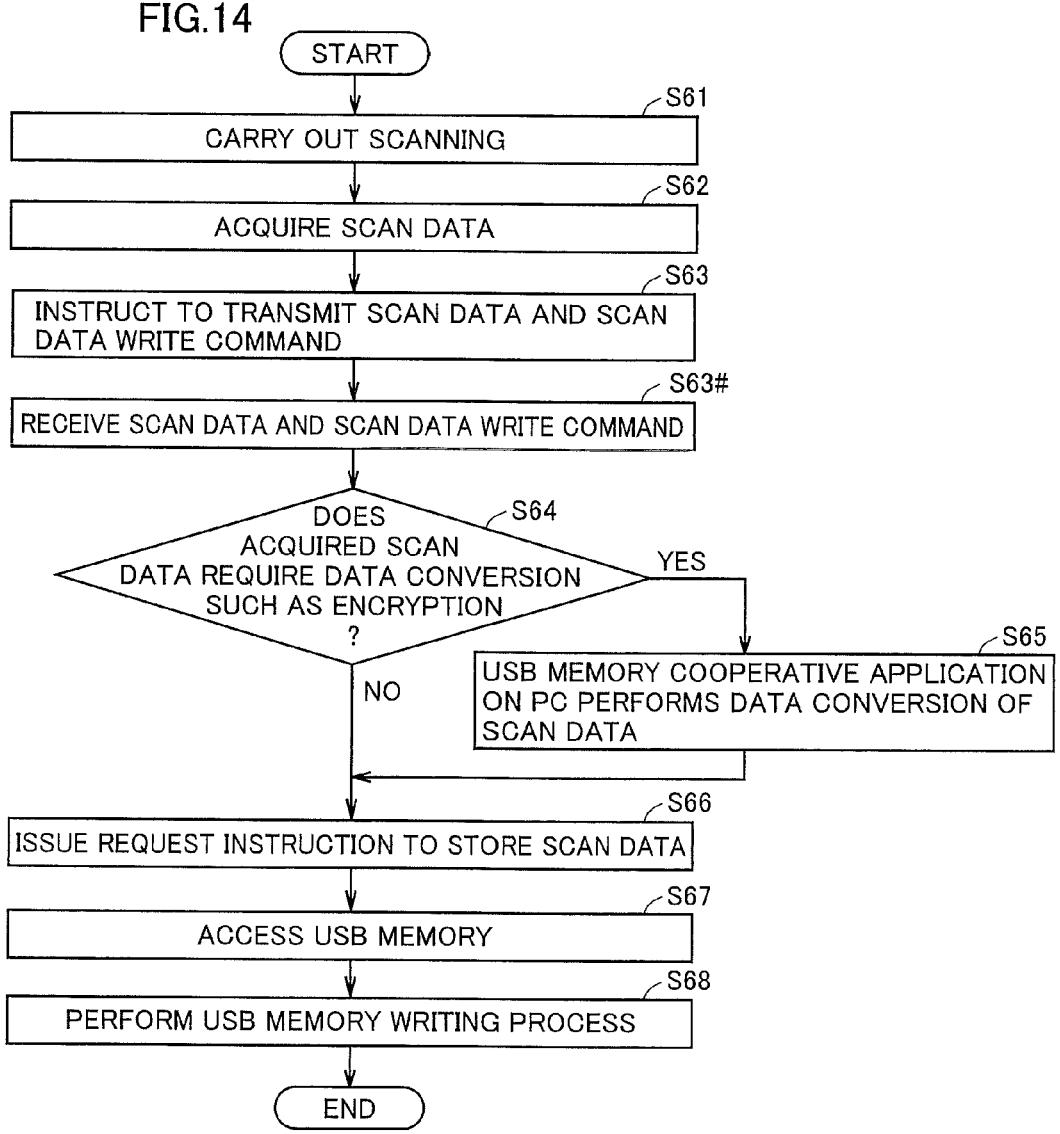
FIG. 14 is a diagram illustrating a process flow when executing the Scan-to-USB memory job for the unanalyzable USB memory according to the embodiment of the present invention.

FIG. 14 illustrates a process flow when executing the Scan-to-USB memory job for the unanalyzable USB memory, according to the embodiment of the present invention.

Referring to FIG. 14, a scanning process is first carried out (step S61). Specifically, in scanner 13, the material such as a paper medium is converted into electronic data.

Scan data is then acquired (step S62).

Specifically, scanner control unit 35 acquires the image data read in scanner 13 as scan data. Scanner control unit 35 outputs the scan data to overall control unit 50.

Overall control unit 50 instructs communication interface 65 by the PC cooperative program to transmit the acquired scan data and a scan data write command to PC 1200 (step S63).

Specifically, overall control unit 50 transmits the scan data and the scan data write command to PC 1200 from communication interface 65 through network 1000.

Communication interface 1207 of PC 1200 receives the scan data and the scan data write command transmitted from communication interface 65 of MFP 1 through network 1000 (step S63#).

Communication interface 1207 of PC 1200 outputs the scan data and the scan data write command to overall control unit 1215.

Overall control unit 1215 of PC 1200 determines whether the acquired scan data requires data conversion such as encryption (step S64).

Specifically, overall control unit 1215 of PC 1200 determines whether the USB memory cooperative application includes the encryption/decryption application, the compression/decompression application, or the like.

In step S64, when determining that data conversion such as encryption is required, that is, determining that the USB memory cooperative application of PC 1200 includes the encryption/decryption application, the compression/decompression application or the like, overall control unit 1215 of PC 1200 performs data conversion of the scan data (step S65).

Specifically, for example, when determining that the USB memory cooperative application includes the encryption application, overall control unit 1215 converts the scan data into encrypted data based on the encryption application. Alternatively, when determining that the USB memory cooperative application includes the compression application, overall control unit 1215 converts the scan data into compressed data based on the compression application. It is to be noted that the encryption application and the compression application may also be combined.

On the other hand, in step S64, when it is determined that data conversion such as encryption is not required, that is, when it is determined that the USB memory cooperative application does not include the encryption/decryption application, the compression/decompression application or the like, data conversion is not performed and the process proceeds to step S66.

In accordance with the scan data write command, overall control unit 1215 of PC 1200 then issues a request instruction to USB control unit 1260 to access the USB memory and store the scan data which has been data converted or the scan data which has not been data converted (step S66).

USB control unit 1260 then accesses the USB memory through USB connection line 15 in accordance with the instruction from overall control unit 1215 (step S67).

Specifically, USB control unit 1260 transmits the scan data and the scan data writing request instruction command to the USB memory through USB connection line 15. USB control unit 60 transfers, to the USB memory, the scan data and the scan data writing request instruction command transmitted from USB control unit 1260 through the USB connection line.

The USB memory stores, in the data area, the scan data received in accordance with the scan data writing request instruction command (writing process) (step S68). The process then ends (end).

Consequently, the scheme as described above allows execution of the Scan-to-USB memory job for the U3® memory.

According to the process as described above, in MFP 1, even if the U3® memory and the like cannot be recognized and accessed due to the type of the OS, the USB connection line connecting USB connector 20 of MFP 1 and USB connector 1220 of PC 1200 to each other is used to transfer the data to PC 1200 capable of recognizing the U3® memory. Then, in PC 1200, the U3® memory or the like is recognized to transmit the data to MFP 1 through the network. Accordingly, access can be achieved in a further simple scheme.

In many cases, the application stored in the U3® memory or the like is configured to be started up only when the data is received through the USB. For example, a network is used to transmit the application stored in the U3® memory or the like from MFP 1 to PC 1200, which poses a problem that the application cannot be started up due to the fact that the transmission is not through the USB. However, as in the scheme of the present application, the data of the application stored in the U3® memory or the like is transferred to USB control unit 1260 of PC 1200 through USB connection line 15 by USB control unit 60 of MFP 1. Consequently, the application stored in the U3® memory or the like can be normally started up.

In the above-described embodiments, the scheme by which overall control unit 1215 of PC 1200 instructs USB control unit 1260 by the MFP cooperative program to access the USB memory has been described. Specifically, while USB control unit 1260 outputs an instruction command and the like to access the USB memory, USB control unit 60 only transfers an instruction command and the like associated with access.

Since USB control unit 60 has the same function as that of USB control unit 1260, it is also possible to configure USB control unit 60 to access the USB memory. Specifically, it may be configured such that USB control unit 1260 transfers the instruction from overall control unit 1215 to USB control unit 60 through USB connection line 15, and USB control unit 60 accesses the USB memory. In this case, USB control unit 1260 carries out only the function of transferring the information.

Furthermore, another scheme can also be employed in which the USB memory connected to USB connector 20 is directly accessed without through USB control unit 60. This can be implemented by, specifically, when performing the USB connection process in step S22 in FIG. 10, USB control unit 60 instructing USB device connection unit 5 to form a path directly connecting the USB connector to which the USB memory is attached and the USB connector to which USB connection line 15 is connected. Specifically, as described above, a switch for switching the path is provided within USB device connection unit 5, by way of example. It is configured such that, in the normal case, the switch electrically connected between USB control unit 60 and the USB connector is used to switch the electrically connected path in accordance with the instruction from USB control unit 60, to thereby form a path electrically connecting the USB connectors to each other. Consequently, USB control unit 1260 can directly access the U3® memory attached to USB connector 20, which is considered as a U3® memory indirectly attached to USB connector 1220 of PC 1200.

Although the USB memory complying with the U3® specifications has been explained in the above description, the USB memory is not limited thereto. For example, another USB memory, which is not recognized by the embedded OS but recognized only by the general-purpose OS, is also similarly applicable.

Although the MFP having a plurality of connectors provided as a USB connector has been described in the present example, the MFP is not particularly limited thereto. In particular, the number of connectors is not limited.

In the present example, the case where the encryption/decryption application and the compression/decompression application are stored as a USB memory cooperative application and these applications are used to decrypt the encrypted data or decompress the compressed data has been described. However, even when any application is not stored in the application area of the USB memory as a USB memory cooperative application, the encryption/decryption application for performing the decryption process of the encrypted data or the compression/decompression application for performing the decompression process of the compressed data may be downloaded through the external server connected to network 1000 for performing the decryption process or the decompression process for the encrypted data. The application is not limited to the encryption/decryption application or the compression/decompression application, but another application program may also be applicable.

It is to be noted that the image input and output apparatus according to the present invention is not limited to an MFP, but may be a printer, a facsimile machine and the like as long as it serves as an image input and output apparatus. Furthermore, with regard to a controller for controlling the image input and output apparatus and the information processing apparatus, the program causing the computer to function and execute control as described in the above flow may also be provided. The above-described program may be recorded in a computer readable recording medium such as a flexible disk, a CD-ROM (Compact Disk-Read Only Memory), a ROM (Read Only Memory), a RAM (Random Access Memory), and a memory card included with a computer, and may be provided as a program product. Alternatively, the program may be provided as recorded in a recording medium such as a hard disk incorporated in the computer. The program may also be provided by downloading through a network.

The program according to the present invention may invoke a necessary module from among program modules provided as a part of the operation system (OS) of the computer at prescribed timing in prescribed sequences and cause the module to perform processing. In this case, the program itself does not include the above-described module but cooperates with the OS to execute processing. The program not including the above-described module may also be included in the program according to the present invention.

Furthermore, the program according to the present invention may be provided as incorporated as a part of another program. Also in this case, the program itself does not include any module included in another program described above, but cooperates with another program to execute processing. The program incorporated in another program may also be included in the program according to the present invention.

The provided program product is installed in a program memory such as a hard disk for execution. It is to be noted that the program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing system comprising:
   an image input and output apparatus including a first USB device connector capable of connecting a USB device;
   an information processing apparatus connected to said image input and output apparatus through a network; and
   a USB connection line for connecting said first USB device connector of said image input and output apparatus and said information processing apparatus to each other,
   said image input and output apparatus including
      a first controller for controlling each part of the image input and output apparatus for executing a prescribed job, and,
      a first USB device controller, when the USB device is connected to said first USB device connector, recognizing information of the USB device and, under control of said first controller, accessing an accessible USB device based on a recognition result,
   when determining that an unrecognizable prescribed USB device is connected to said first USB device connector, said first USB device controller transmitting the information of said prescribed USB device through said USB connection line,
   said information processing apparatus including
   a second controller for controlling each part of the information processing apparatus for executing a prescribed job, and,
   a second USB device controller recognizing the information of said prescribed USB device transferred from said first USB device controller through said USB connection line and, under control of said second controller, accessing an accessible USB device based on a recognition result,
   said second USB device controller providing an output of said recognition result to said second controller, and
   said second controller receiving said recognition result and causing said first USB device controller to access, through said second USB device controller, said prescribed USB device connected to said first USB device connector.

2. The information processing system according to claim 1, wherein
   said image input and output apparatus further includes
   a reading unit reading a document to generate image data, and
   a first communication interface for transmitting and receiving data to and from said information processing apparatus through said network,
   said information processing apparatus further includes a second communication interface for transmitting and receiving data to and from said image input and output apparatus through said network,
   when receiving an instruction to store the image data read by said reading unit in said prescribed USB device unrecognizable to said first USB device controller connected to said first USB device connector, said first communication interface transmits the image data read by said reading unit to said second communication interface of said information processing apparatus connected through said network, and said first USB device controller performing a process of writing, in said prescribed USB device connected to said first USB device connector, said image data transferred through said USB connection line by said second USB device controller.

3. The information processing system according to claim 1, wherein said image input and output apparatus further includes a printer for performing a process of printing image data, and a first communication interface for transmitting and receiving data to and from said information processing apparatus through said network, said information processing apparatus further includes a second communication interface for transmitting and receiving data to and from said image input and output apparatus through said network, when receiving an instruction for said printer to print the image data stored in said prescribed USB device unrecognizable to said first USB device controller connected to said first USB device connector, said first USB device controller transfers the image data read from said prescribed USB device through said USB connection line to said second USB device controller, said second communication interface transmits the image data read from said prescribed USB device acquired by said second USB device controller through said USB connection line to said first communication interface of said image input and output apparatus connected through said network, and said printer performs the process of printing the image data received through said first communication interface.

4. The information processing system according to claim 1, wherein said first USB device connector includes a plurality of connector terminals for connecting to a plurality of USB devices, one connector terminal of said plurality of connector terminals is connected to said USB connection line, and when said prescribed USB device is connected to another connector terminal of said plurality of connector terminals, said another connector terminal is electrically connected to a connector terminal connected to said USB connection line.

5. A method for controlling an information processing system, said information processing system including an image input and output apparatus having a first USB device connector capable of connecting a USB device, a first controller for controlling each part of the image input and output apparatus for executing a prescribed job, and a first USB device controller recognizing information of the USB device connected to said first USB device connector and, under control of said first controller, accessing an accessible USB device based on a recognition result, an information processing apparatus connected to said image input and output apparatus through a network and including a second controller to control each part of the information processing apparatus for executing the prescribed job, and a second USB device controller recognizing the information of the USB device and, under control of said second controller, accessing an accessible USB device based on the recognition result, and a USB connection line for connecting said first USB device connector of said image input and output apparatus and said information processing apparatus to each other, said method comprising the steps of:

in said image input and output apparatus, accepting connection of the USB device in said first USB device connector;

determining whether the USB device connected to said first USB device connector is an inaccessible prescribed USB device or not, based on a fact that the information of the USB device is recognizable to said first USB device controller;

when determining in said determining step that the USB device connected to said first USB device connector is accessible to said first USB device controller, causing said first USB device controller to access the USB device under control of said first controller;

when determining in said determining step that the USB device connected to said first USB device connector is said prescribed USB device that is inaccessible to said first USB device controller, transferring the information of said USB device to said second USB device controller through said USB connection line;

in said information processing apparatus, recognizing the information of said USB device transferred through said USB connection line by said USB device controller;

providing an output of the recognition result recognized in said recognizing step to said second controller;

in response to said recognition result, said second controller causing said first USB device controller to access, through said second USB device controller, said prescribed USB device connected to said first USB device connector.

6. The method for controlling the information processing system according to claim 5, said image input and output apparatus further including a reading unit reading a document to generate image data, and a first communication interface for transmitting and receiving data to and from said information processing apparatus through said network, said information processing apparatus further including a second communication interface for transmitting and receiving data to and from said image input and output apparatus through said network, said method comprising the steps of:

in said image input and output apparatus, when receiving an instruction to store the image data read by said reading unit in said prescribed USB device unrecognizable to said first USB device controller connected to said first USB device connector, causing said first communication interface to transmit the image data read by said reading unit to said second communication interface of said information processing apparatus connected through said network, and causing said first USB device controller to perform a process of writing, in said prescribed USB device connected to said first USB device connector, said image data transferred through said USB connection line by said second USB device controller.

7. The method for controlling the information processing system according to claim 5, said image input and output apparatus further including a printer for performing a process of printing image data, and a first communication interface for transmitting and receiving data to and from said information processing apparatus through said network, said information processing apparatus further including a second communication interface for transmitting and receiving data to and from said image input and output apparatus through said network, said method comprising the steps of:

in said image input and output apparatus, when receiving an instruction for said printer to print the image data stored in said prescribed USB device unrecognizable to said first USB device controller connected to said first USB device connector, causing said first USB device controller to transfer the image data read from said prescribed USB device through said USB connection line to said second USB device controller, in said information processing apparatus, causing said second communication interface to transmit the image data read from said prescribed USB device acquired by said second USB device controller through said USB connection line to said first communication interface of said image input and output apparatus connected through said network, and in said image input and output apparatus, causing said printer to perform the process of printing the image data received through said first communication interface.

8. The method for controlling the information processing system according to claim 5, wherein said first USB device connector includes a plurality of connector terminals for connecting to a plurality of USB devices, one connector terminal of said plurality of connector terminals is connected to said USB connection line, and when said prescribed USB device is connected to another connector terminal of said plurality of connector terminals, said another connector terminal is electrically connected to a connector terminal connected to said USB connection line.

* * * * *